Nov. 2, 1954
W. W. McCLOW
2,693,283
AIR LOCK
Filed Feb. 11, 1950
5 Sheets-Sheet 4
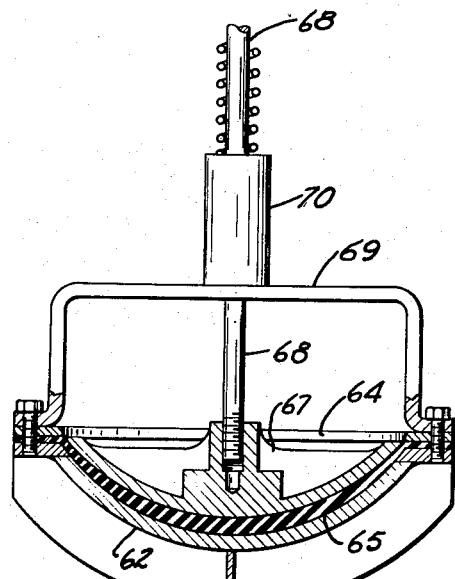
Fig. V
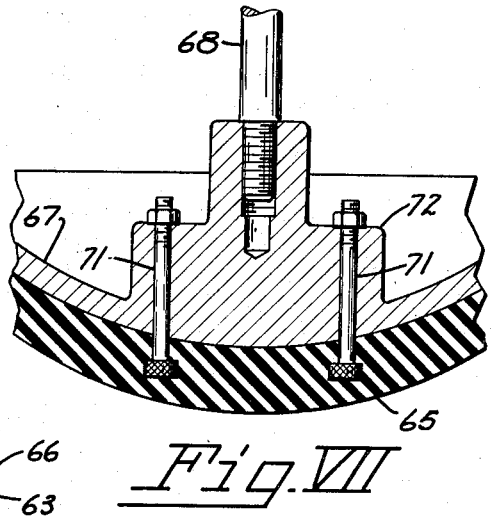
Fig. VII
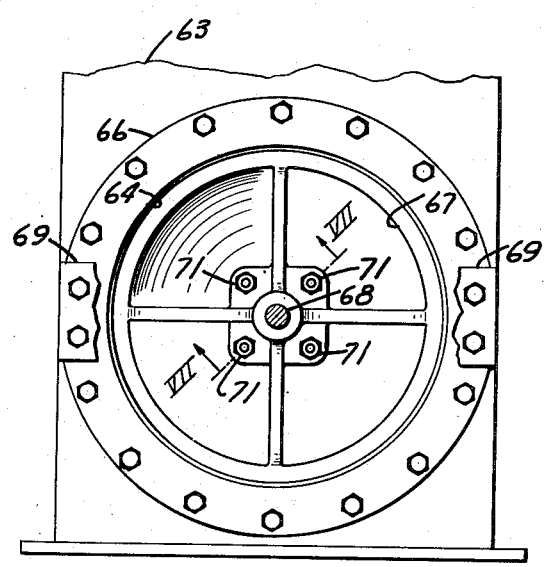
Fig. VI
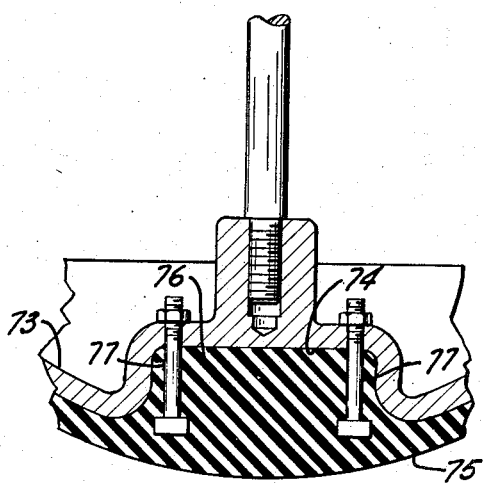
Fig. VIII
Inventor
Wayne W. McClow
By
Marshall, Marshall & Leonard
Attorneys

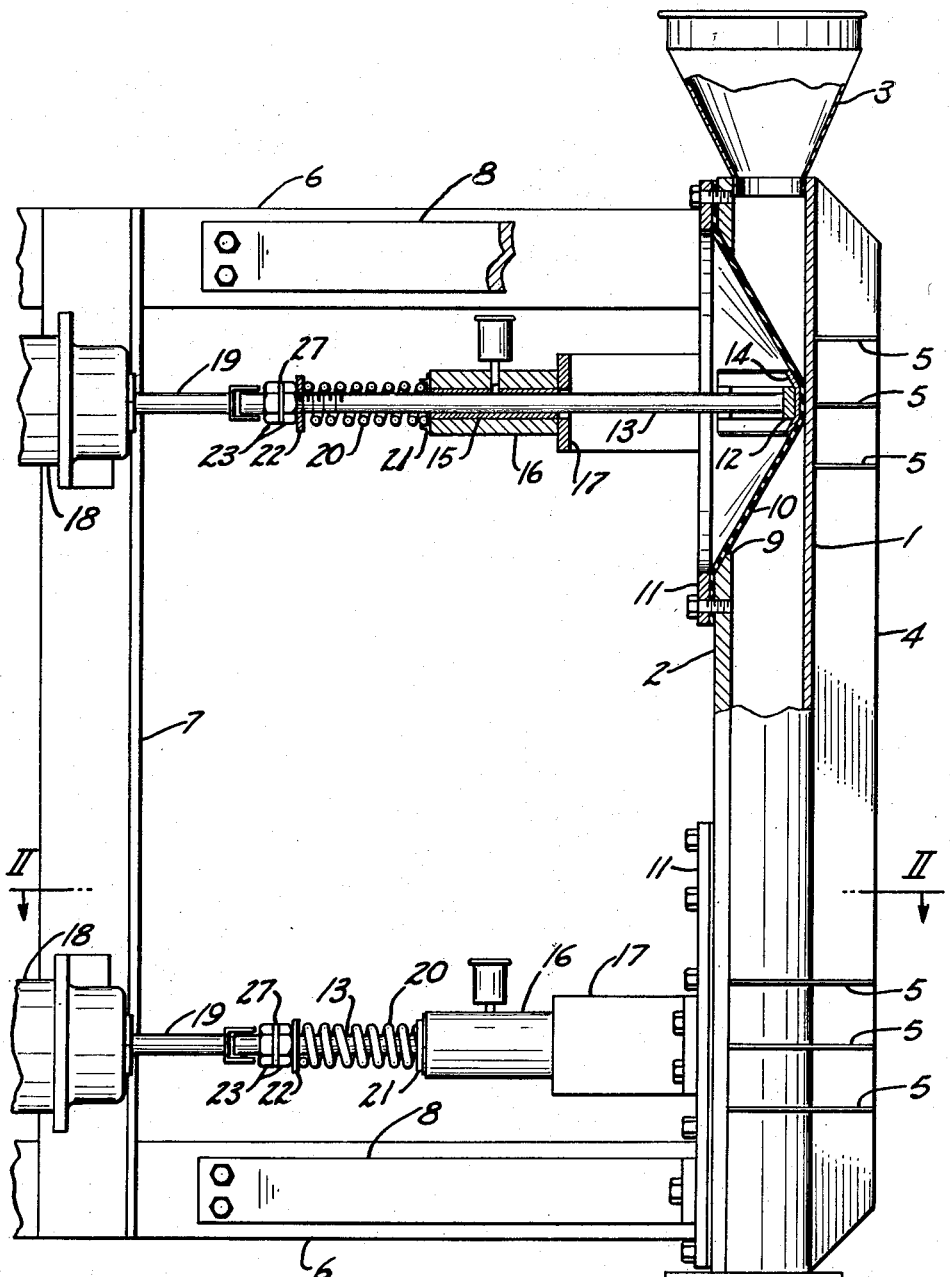

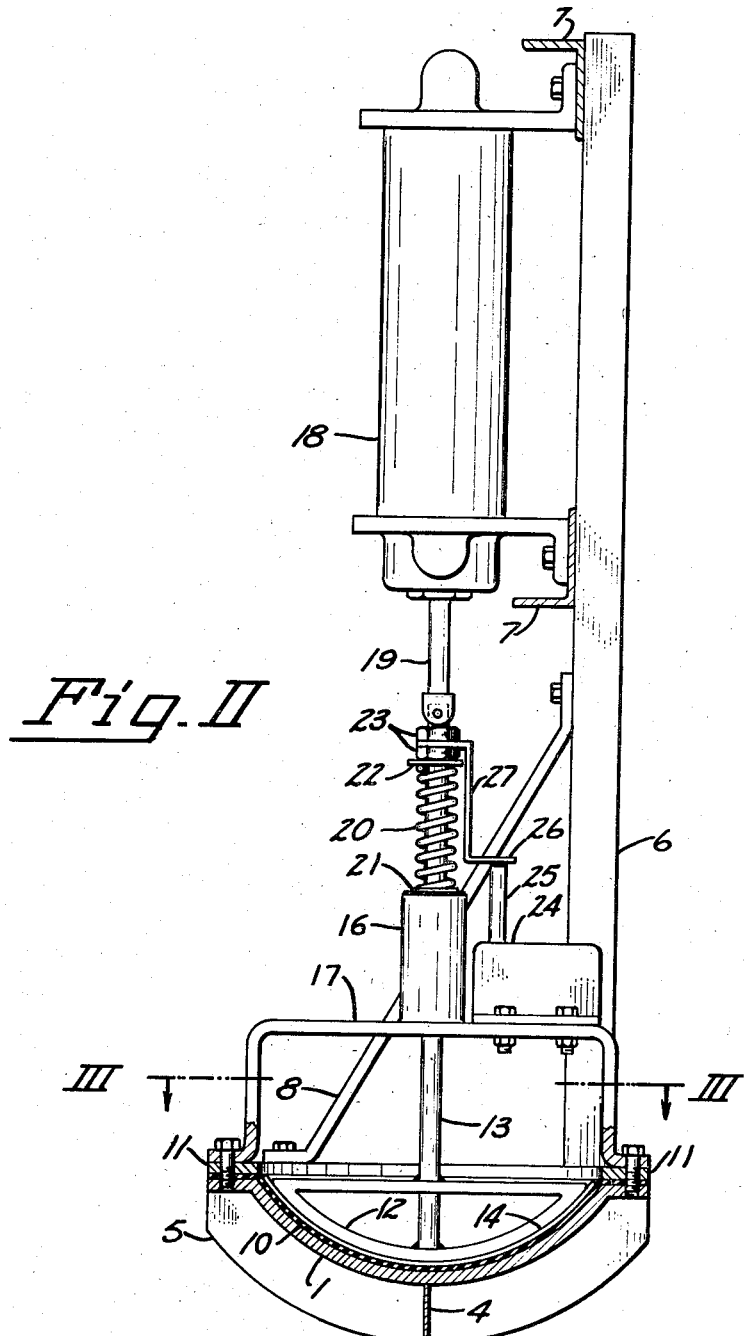

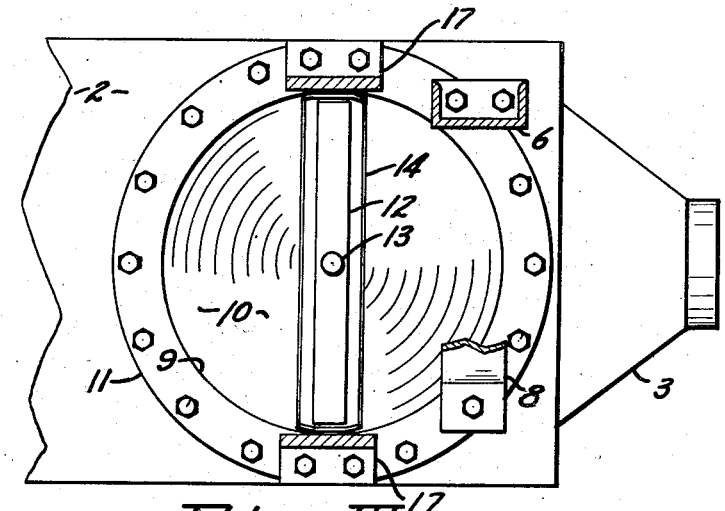
*Fig. III*
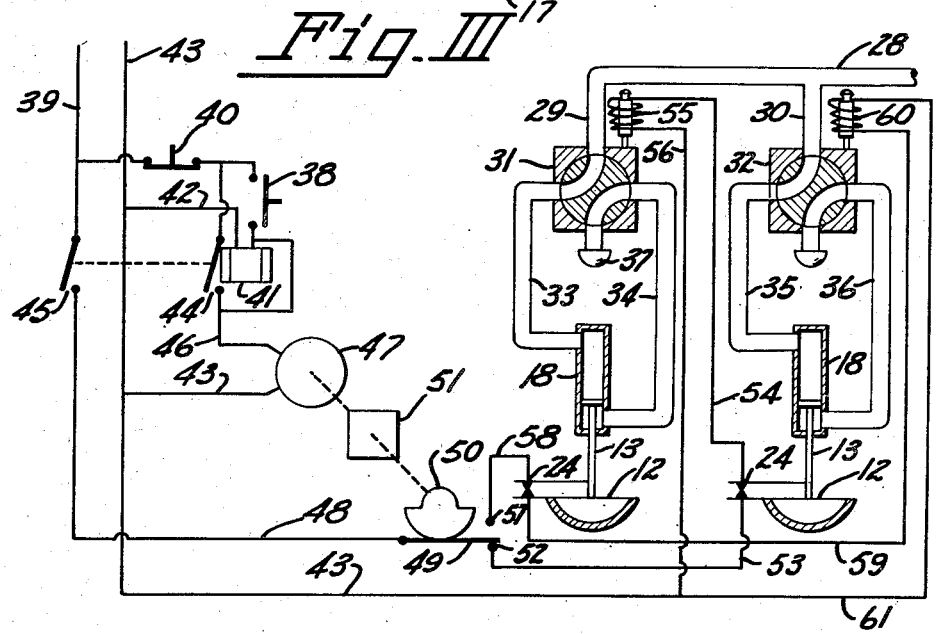
*Fig. IV*

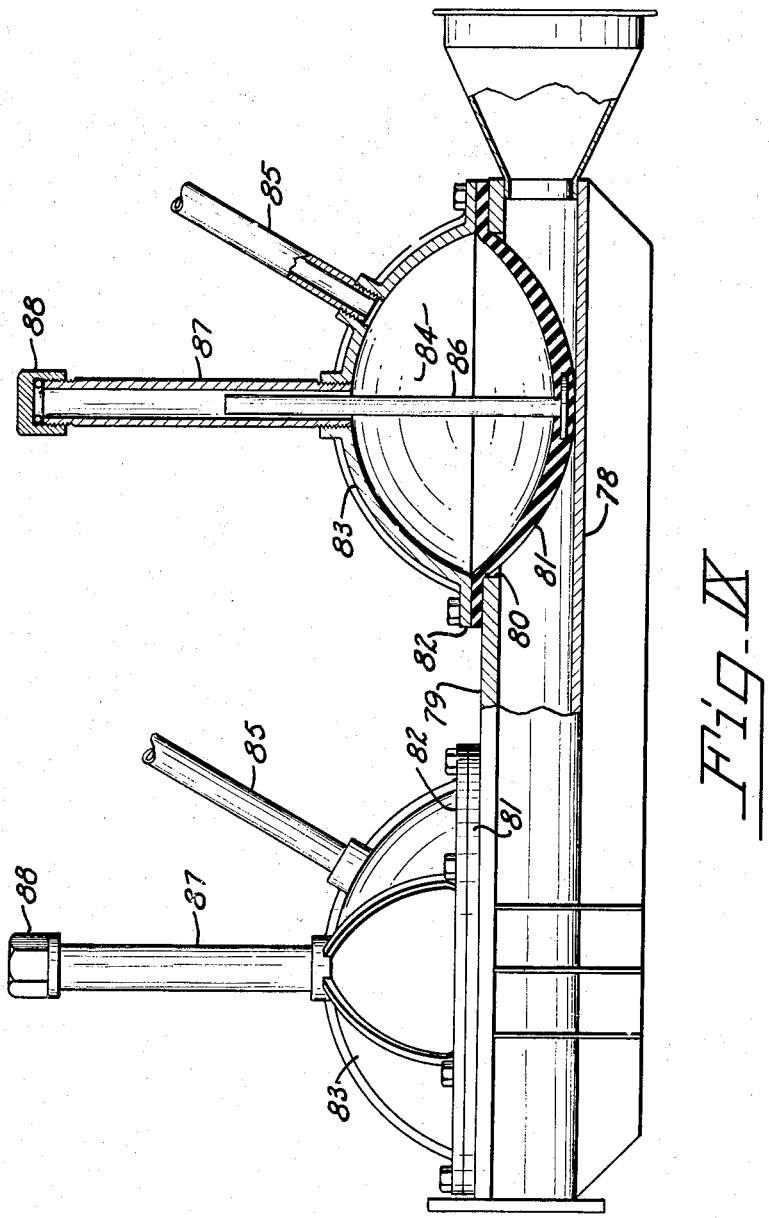

United States Patent Office 2,693,283
Patented Nov. 2, 1954

2,693,283

AIR LOCK

Wayne W. McClow, Toledo, Ohio, assignor, by mesne assignments, to Allied Chemical & Dye Corporation, New York, N. Y., a corporation of New York Application February 11, 1950, Serial No. 143,637

7 Claims. (Cl. 214—17)

This invention relates to material handling equipment and in particular to air locks that may be used to admit or discharge material into a sealed space maintained under pressure or vacuum.

Feeding equipment in the nature of star feeders or rotary valving arrangements have been used for admitting or removing material from a region maintained at a pressure other than atmospheric. These feeders or valving arrangements are satisfactory as long as the material does not work into the clearance spaces in the valves or feeders to cause binding. In the handling of synthetic resin powders such feeders are unsatisfactory because not only does the powder work into the clearance spaces but also friction forces developed in the material caught in the clearance spaces cause overheating of the material and darkening thereof. The darkened flecks of material are objectionable in the finished product.

The object of this invention is to provide an air lock for use in a conveying system for admitting or discharging material from an enclosed space, which air lock does not at any time bind or impose frictional forces on the material.

Another object of the invention is to provide an air lock that is simple to construct and operate and which performs equally satisfactory in either a pressure or a vacuum system.

Another object of the invention is to provide an air lock having practically no spaces where material may lodge and which thus may be easily cleaned when changing over from one type of material to another.

More specific objects and advantages are apparent from the following description of a preferred embodiment of the invention.

According to the invention a chute or discharge passage is formed of a cover plate and a trough-like member that are fastened together along their edges. The cover plate has a pair of spaced apart openings extending from side to side each of which openings is closed by an imperforate membrane sealed around the periphery of the opening and arranged to be driven against the inside surface of the trough-like portion of the chute. Means are provided for actuating the membrane and these means are interlocked by means of limit switches or similar equipment so that neither membrane may be released unless the other is clamped in passage obstructing position. Any type of mechanical, hydraulic or pneumatic actuating mechanism may be employed to drive the membranes into chute obstructing position. Furthermore, the cross sections of the trough preferably are segments of circles so that there is a minimum of stretching in the membranes as they are forced into passage obstructing position.

A preferred embodiment of the invention is illustrated in the accompanying drawings.

In the drawings:

Figure I is a front elevation partly in section of the improved air lock.

Figure II is a plan view partly in section of the improved air lock as seen from the line II—II of Figure I.

Figure III is a fragmentary elevation as seen from the line III—III of Figure II.

Figure IV is a schematic diagram indicating the control mechanism for actuating the improved air lock.

Figure V is a fragmentary horizontal section showing a modification of the air lock.

Figure VI is a front elevation with parts broken away of the modified air lock.

Figure VII is an enlarged fragmentary section of a portion of the mechanism shown in Figures V and VI as seen from the line VII—VII of Figure VI.

Figure VIII is a fragmentary detail of a slightly modified form of the structures shown in Figures V and VI.

Figure IX is an elevation, partly in section, of another form of the improved air lock.

These specific figures and the accompanying description are intended merely to illustrate the invention but not to limit its scope.

In the preferred form of the invention a vertical or inclined chute or closed passage is constructed of a segmentally cross-sectioned trough 1 to which a cover plate 2 is secured along the edges thereof. At the upper end a transition member 3 is arranged to connect the segmentally cross-sectioned air lock chute with a circular discharge opening or hopper mouth through which material is admitted to the air lock chute. A longitudinally extending stiffening rib 4 and horizontally extending ribs 5 serve to support the trough 1 against deflection in bending.

The assembly of the trough 1 and cover plate 2 is mounted on a pair of arms 6 included in a framework 7. Braces 8 rigidly hold the chute at the ends of the arms 6.

The cover plate 2 has a pair of spaced apart openings 9 that are closed by rubber diaphragms or membranes 10 that extend across the openings 9 and that are sealed by clamping rings 11 to the peripheries thereof. The openings 9 are generally circular in form and extend from side to side of the trough portion 1 so that segmentally shaped shoes 12 carried on the ends of actuating rods 13 may be driven through the holes 9 to clamp the membranes 10 against the concave inner surface of the trough 1. Since the diameter of each of the holes 9 is substantially equal to or slightly greater than the width of the trough-like portion 1 each segmentally shaped shoe 12 is capable of exerting pressure along the full width of the chute.

To secure a more nearly uniform distribution of pressure and to prevent high localized compression stresses in the rubber membrane 10, the shoes 12 are fitted with guards 14 having inclined sides or wings that are substantially tangent to the stretched position of the membrane and which wings are formed smoothly over the shoes 12 so that no high local pressure is exerted on the membranes. The guards may be constructed of metal or a resilient material such as plastic or bubber.

If the system is to be operated under vacuum it is desirable, and may be necessary, that each membrane 10 be cemented or otherwise secured to the center section of the guard 14 or the shoe 12 so that atmospheric pressure acting against the exterior of the membrane will not hold the membrane in passage obstructing position when the actuating rod 13 withdraws the shoe 12.

Each actuating rod 13 is journaled for axial movement through a sleeve bearing 15 carried in an extension 16 of a bridge 17 spanning the corresponding opening 9. A pair of air cylinders 18, one for each of the actuating rods 13 and shoes 12, are mounted in line with the actuating rods 13 and have their piston rods 19 linked to the ends of the actuating rods 13. Other types of actuating mechanism may, of course, be substituted for the air cylinders 18 in actuating the air lock.

Referring to Figures I and II coiled springs 20 are sleeved over each of the actuating rods 13 and, when the shoes are driven to membrane clamping position, are stressed in compression between a spring seat 21 on the end of the bridge extension 16 and a second seat 22 held in place by lock nuts 23 screwed onto the threaded end of the actuating rod 13. The springs 20 serve to cushion the clamping stroke of the air cylinders 18 so that the shoes 12 do not pound against the trough-like section 1 of the chute. The springs 20 are not so stiff, however, as to overcome the force of the air cylinders 18 and prevent complete sealing of the chute. In operation, air supplied to the air cylinders 18 is throttled so that a greater portion of the stroke results from the expansion of the air as it is admitted into the cylinder and its final clamping, after the spring 20 seats on the bridge extension 16, is accomplished by a building up in pressure as the cylinder pressure rises to equal the supply pressure. The springs 20 are not attached to the spring seats 21 and 22 but are free to float on the actuating rods 13 during the greater part of the strokes of the rods.

A limit switch 24 is mounted on each of the bridges 17 with its actuating plunger 25 projecting toward the corresponding air cylinder 18 in position to be actuated by a flat end 26 of a Z-shaped bar 27 the other end of which is clamped between the lock nuts 23 on the actuating rod 13. Each switch 24 is adjusted to operate just as the associated shoe 12 clamps the membrane 10 against the concave side of the trough-like chute 1.

Figure III is a fragmentary elevation of the upper end of the improved air lock. This figure brings out the fact that preferably the spaced apart openings 9 through the cover plate 2 are circular in form and that the metal or resilient guard 14 extends only a short distance either side of the shoe 12 so as to minimize the stretching of the membrane 10 when it is clamped against the inner surface of the trough-like portion 1.

The control mechanism for the improved air lock is illustrated schematically in Figure IV. The shoe operating air cylinders 18 are supplied with high pressure air from a pipe 28, which is connected through branch pipes 29 and 30 to solenoid actuated four-way valves 31 and 32. Pipes 33 and 34 connect one of the cylinders 18 to the solenoid valve 31 while other pipes 35 and 36 connect the other of the cylinders 18 to the solenoid valve 32. The valves are shown in their de-energized position in which air is admitted from the pipe 28 through the pipe 29 and the valve 31 and pipe 33 to one end of the cylinder 18 so as to drive the actuating rod 13 and shoe 12 into clamping position. At the same time the air driven ahead of the piston of the cylinder 18 flows through the pipe 34, the valve 31 and out through a silencer 37. The solenoid valve 32 is also shown in its de-energized position so that the associated actuating rod 13 and shoe 12 are driven into clamping position. Thus both ends of the air lock are closed as long as there is a supply of air pressure and the control valves are deenergized.

When it is desired to allow material to flow through the air lock a push button switch 38 is closed so that current may flow from a supply lead 39 through a stop switch 40, the now closed contacts of the push button 38, a relay coil 41 and a lead 42 connected to a return power lead 43. Current flow through the relay coil 41 causes it to close its contacts 44 and 45. The contacts 44 are in parallel with the contacts of the push button 38 and serve to maintain current flow through the relay coil 41 when the push button is released. Closure of the contacts 44, or of the push button 38, allows current to flow through a lead 46 to a clock motor 47. Closure of the other relay contacts 45 allows current to flow from the supply lead 39 through a lead 48 to a movable pole 49 of a single-pole double-throw switch. A cam 50 driven from the clock motor 47 through a gear reduction 51 controls the operation of the movable pole 49 of the single-pole double-throw switch.

When the switch is in the position shown current flows from the now closed contact 52 through a lead 53, the contacts 24 of the limit switch operated by the second one of the air cylinders 18, the one associated with the solenoid valve 32, and then through a lead 54 to a solenoid coil 55 actuating the first solenoid valve 31. From the coil 55 current flows through a lead 56 to the return lead 43. Energization of the solenoid coil 55 causes the valve 31 to reverse its position to admit air under pressure through the pipe 34 and exhaust the pipe 33 whereupon the first of the air cylinders 18 retracts its clamping shoe 12 to open the corresponding end of the air lock. If this is the lower cylinder shown in Figure I this operation allows any material within the lock to be discharged downwardly out of the lock. Conversely if the solenoid valve 31 controls the upper of the air cylinders 18 it opens the upper end of the air lock to receive material through the transition member 3.

A short time later as the clock motor 47 drives the cam 50 the pole 49 moves to its other position cooperating with a contact 57 so that current flow through the contact 52 and the solenoid coil 55 is interrupted and circuit is established from the lead 48 through the other contact 57 of the double throw switch. The contact 57 is connected through a lead 58 to the limit switch 24 associated with the first cylinder 18. At the instant of operation of the double throw switch this last mentioned limit switch is open. As soon as the solenoid valve 31 returns to its normal position and the activated rod of the first cylinder 18 is driven to clamping position this limit switch 24 is closed so that current may flow through a lead 59 and a solenoid coil 60 of the other solenoid valve 32 and back through a lead 61 to the return lead 43. Energization of the coil 60 operates the solenoid valve 32 so that air under pressure in the pipe 28 is fed through the pipe 36 thus causing the second of the air cylinders 18 to withdraw its clamping shoe 12 to open that end of the air lock.

It will be observed from this circuit that neither air cylinder 18 may be driven to its non-clamping position unless the other of the cylinders is in its clamping position with its limit switch 24 closed. This circuit in a simple way provides an interlocked operation of the air cylinders 18 so that at no time is there direct communication through the air lock with consequent loss of vacuum or pressure. Neither is there an appreciable time during which both air cylinders are operated to close the air lock since each is released the instant the other reaches its clamping position.

In the modified form of air lock operating mechanism shown in Figures V to VIII inclusive the structure comprises a shallow transversely curved trough 62 the edges of which are welded to a flat cover plate 63 to form a duct leading from the sealed space. The cover plate 63 is provided with a pair of generally circular holes 64 that are spaced apart along the length of the duct and that extend from side to side of the trough 62. A diaphragm or membrane 65 made of a stretchable material covers each hole 64 and sealed around its periphery by means of a clamping ring 66. The membrane 65 is also attached near its center to the central portion of a shoe 67 that is in the form of the polar zone of a sphere and that is carried on the end of a drive rod 68 that is in turn connected to a drive mechanism which may be similar to that shown in the first example. A bridge 69 erected over the opening 64 carries a guide bearing 70 for supporting the drive rod 68.

Referring to Figure VII the membrane or diaphragm is made of a fairly thick sheet or molded piece of flexible rubber and has molded therein near its center a plurality of bolts 71 that extend up through a central boss 72 of the shoe 67 and that serve to secure the center section of the membrane or diaphragm 65 to the shoe 67. The bolts 71 constitute the only connection between the membrane or diaphragm 65 and the shoe 67 so that the diaphragm or membrane may conform to the shape of the trough 65 and shoe 67 when it is in passage obstructing position as shown in Figure V and may extend straight across the opening in the plane of the cover plate 63 when the shoe 67 is withdrawn to open the passage.

If the bolt heads are molded directly in the rubber membrane or diaphragm 65 as shown in Figure VII the membrane must have great thickness in order to enclose the bolt heads and at the same time provide sufficient resiliency and yield to satisfactorily accommodate itself to small irregularities in the shape of the trough. To avoid this difficulty a modified shoe 73 Figure VIII may be constructed with a recess 74 in the center of its face and a membrane or diaphragm 75 formed with a thick center section 76 fitting into the recess 74. Bolts 77 may be molded onto the thickened section 76 to secure the membrane to the shoe 73.

A shoe formed as a polar zone of a sphere offers certain advantages over the narrow shoe shown in Figures I, II and III in that the stretching of the flexible member or diaphragm is more evenly distributed and greater support is given the membrane when it is forced into passage obstructing position.

Still another form of operating mechanism for the improved air lock is illustrated in Figure IX. In this modification a shallow trough 78 having a cross section that corresponds generally to a segment of a circle is fitted with a cover plate 79 that has a pair of openings 80 spaced apart along the length of the duct formed by the trough 78 and cover 79. At each opening a rather thick membrane or diaphragm 81 of stretchable material is clamped at its marginal area to the plate 79 at the periphery of the opening 80 by a rim 82 of a shell 83. The shell 83 may be flat or concave toward the diaphragm or membrane 81 and with the diaphragm forms a closed chamber 84 to which pressure or vacuum may be applied through a connecting pipe 85. The pipe 85 may be suitably provided with valves so that it may be selectively connected to a source of pressure greater than that existing in the duct whenever it is desired to force the membrane 81 to passage obstructing position. The valving is also arranged so that the pipe 85 may be connected to a source of pressure less than the pressure existing in the duct wherenver it is desired to retract the membrane 81 to open the passage. If atmospheric pressure exists within the closed system connected to the duct a positive pressure applied within the chamber 84 will drive the membrane to passage obstructing position while a vacuum applied to the chamber will open the duct.

It may be desirable in some instances to guide the center portion of the membrane 81 and if such guiding is found esirable a stem 86 may have an end secured in the membrane 81 and have its other end portion guided in a tube or sleeve 87 extending from the shell 83 and closed by a cap 88 at its remote end. The speed of operation, particularly of the center part of the diaphragm 81, may be controlled to a small extent by the dashpot effect of the rod or stem 86 working in the sleeve 87.

The improved air locks make it possible to transfer materials that are sensitive to friction without damaging the material in any way and make it possible to operate into or from a region or space that is maintained either under pressure or under vacuum. There are no crevices of appreciable extent in which the powdered material may lodge to interfere with the operation of the device or the cleaning of the air lock when a change is made in the materials being handled. The improved air locks operate equally satisfactorily with systems operated under pressure or under vacuum.

Various modifications in details of construction may be made without departing from the spirit and scope of the invention.

Having described the invention, I claim:

1. In a device for discharging powdered material from a sealed space, in combination, a shallow trough, a flat cover plate sealed to the outer edges of the trough, said trough and cover plate forming a duct leading from a sealed space, said cover plate having a pair of openings spaced apart along the length of the cover and each extending from side to side of the trough, an imperforate stretchable membrane extending across and sealed to the outer surface of the cover plate around the periphery of each opening, a timer, and means, located outside said duct, and controlled by the timer for distending the membrane through said opening into trough obstructing position and withdrawing it from obstructing position, said timer being adapted to operate said membrane distending means in a material receiving and discharging sequence.

2. A device for discharging powdered material from a sealed space according to claim 1 in which the membrane distending means comprises a shoe that conforms to the shape of the trough and that is driven through the opening to force the membrane against the opposite wall of the duct, each membrane being attached at its center to one of the shoes.

3. A device for discharging powdered material from a sealed space according to claim 1 in which a cross section of the trough is a segment of a circle, and the said opening and their associated membranes likewise are circular with a diameter at least as large as the width of said trough, whereby the stretching of the membrane is minimized.

4. A device for discharging powdered material from a sealed space according to claim 1 in which the membrane distending means comprises a shell mounted over each opening and over said membrane and the said membrane distending means controlled by the timer comprises valves and a pneumatic system for alternately applying to the space in the shell pressures greater than and less than the pressure in the sealed space and a pneumatic guide attached to the center of each membrane to exert a damping effect on the said membranes.

5. In a device for discharging powdered material from a sealed space, in combination, a shallow trough, a flat cover plate sealed to the outer edges of the trough, said trough and cover plate forming a duct leading from a sealed space, said cover plate having a pair of openings spaced apart along the length of the cover and each extending from side to side of the trough, an imperforate stretchable membrane extending across and sealed to the outer surface of the cover plate around the periphery of each opening, a shoe for each opening, each membrane being at its center attached to one of the shoes, and means for driving the shoes through the openings to force the membranes against the opposite wall of the trough in a trough-obstructing position and to return the shoes to their original position.

6. A device for discharging powdered material from a sealed space according to claim 5 in which the shoe is narrow and has wings extending to each side of the shoe to minimize local stress in the membrane.

7. A device for discharging powdered material from a sealed space according to claim 5 in which the shoe has a shape corresponding to the polar zone of a sphere and a cross section of the trough is a segment of a circle.

References Cited in the file of this patent

UNITED STATES PATENTS

| Number | Name | Date |
|---|---|---|
| 2,470,744 | Korn | May 17, 1949 |
| 2,487,226 | Eastman | Nov. 8, 1949 |

FOREIGN PATENTS

| Number | Country | Date |
|---|---|---|
| 360,943 | Great Britain | Nov. 9, 1931 |